United States Patent
Lee et al.

(10) Patent No.: US 9,749,809 B2
(45) Date of Patent: Aug. 29, 2017

(54) METHOD AND SYSTEM FOR DETERMINING THE LOCATION AND POSITION OF A SMARTPHONE BASED ON IMAGE MATCHING

(71) Applicant: University of Seoul Industry Cooperation Foundation, Seoul (KR)

(72) Inventors: Im Pyeong Lee, Seoul (KR); Kyoung Ah Choi, Seoul (KR); Ho Jun Kim, Seoul (KR)

(73) Assignee: University of Seoul Industry Cooperation Foundation (KR)

( * ) Notice: Subject to any disclaimer, the term of this patent is extended or adjusted under 35 U.S.C. 154(b) by 185 days.

(21) Appl. No.: 14/397,275

(22) PCT Filed: Nov. 14, 2012

(86) PCT No.: PCT/KR2012/009568
§ 371 (c)(1),
(2) Date: Oct. 27, 2014

(87) PCT Pub. No.: WO2013/162140
PCT Pub. Date: Oct. 31, 2013

(65) Prior Publication Data
US 2015/0126223 A1    May 7, 2015

(30) Foreign Application Priority Data
Apr. 26, 2012  (KR) .................. 10-2012-0043618

(51) Int. Cl.
*H04W 4/04*    (2009.01)
*G01S 5/00*    (2006.01)
(Continued)

(52) U.S. Cl.
CPC ............. *H04W 4/04* (2013.01); *G01S 5/0009* (2013.01); *G06T 7/74* (2017.01); *H04W 4/021* (2013.01);
(Continued)

(58) Field of Classification Search
CPC ....... H04W 4/04; H04W 4/021; H04W 4/027; G06T 7/0044; G06T 2207/30244;
(Continued)

(56) References Cited

U.S. PATENT DOCUMENTS 9,092,185 B2    7/2015  Mizuno et al.
2007/0268392 A1*  11/2007  Paalasmaa ............. G01C 21/20
                                                    348/333.02
(Continued)

FOREIGN PATENT DOCUMENTS

CN    1570665 A    1/2005
CN    101617197 A    12/2009
(Continued)

OTHER PUBLICATIONS

Triggs, Bill et al., "Bundle Adjustment—A Modern Synthesis", Security in Communication Networks: Third International Conference, Jan. 1, 2000, 298-372.
Chinese Office Action (CN 201280072738), SIPO, Jun. 1, 2017.

*Primary Examiner* — Chuong A Ngo
(74) *Attorney, Agent, or Firm* — Park & Associates IP Law, P.C.

(57) ABSTRACT

The present invention relates to a method and system for determining location and position for the effective use thereof in a location-based service by precisely determining information on the location and position of a user terminal, such as a smartphone, to provide the determined location and position to the user terminal using a georeferenced reference image DB preconstructed on a server on a network or on the user terminal, and images captured by a camera of the user terminal.

10 Claims, 3 Drawing Sheets

(51) Int. Cl.
  *H04W 4/02*  (2009.01)
  *G06T 7/73*  (2017.01)
  *H04L 29/08*  (2006.01)

(52) U.S. Cl.
  CPC ... *H04W 4/027* (2013.01); *G06T 2207/30244* (2013.01); *H04L 67/18* (2013.01)

(58) Field of Classification Search
  CPC ....... G01S 5/0009; G01S 19/42; H04L 67/18; G06F 3/048; G01C 19/02
  See application file for complete search history.

(56) References Cited

U.S. PATENT DOCUMENTS

| | | |
|---|---|---|
| 2010/0034426 A1 | 2/2010 | Takiguchi et al. |
| 2011/0055769 A1 | 3/2011 | Lim |
| 2011/0071757 A1 | 3/2011 | Lee et al. |
| 2011/0115902 A1 | 5/2011 | Jiang et al. |
| 2013/0162785 A1 | 6/2013 | Michot et al. |

FOREIGN PATENT DOCUMENTS

| | | |
|---|---|---|
| CN | 102123231 A | 7/2011 |
| FR | 2960082 A1 | 11/2011 |
| KR | 1020110004940 A | 1/2011 |
| KR | 1020110004974 A | 1/2011 |
| KR | 1020110021464 A | 3/2011 |
| KR | 1020110032765 A | 3/2011 |
| KR | 1020110064712 A | 6/2011 |

* cited by examiner

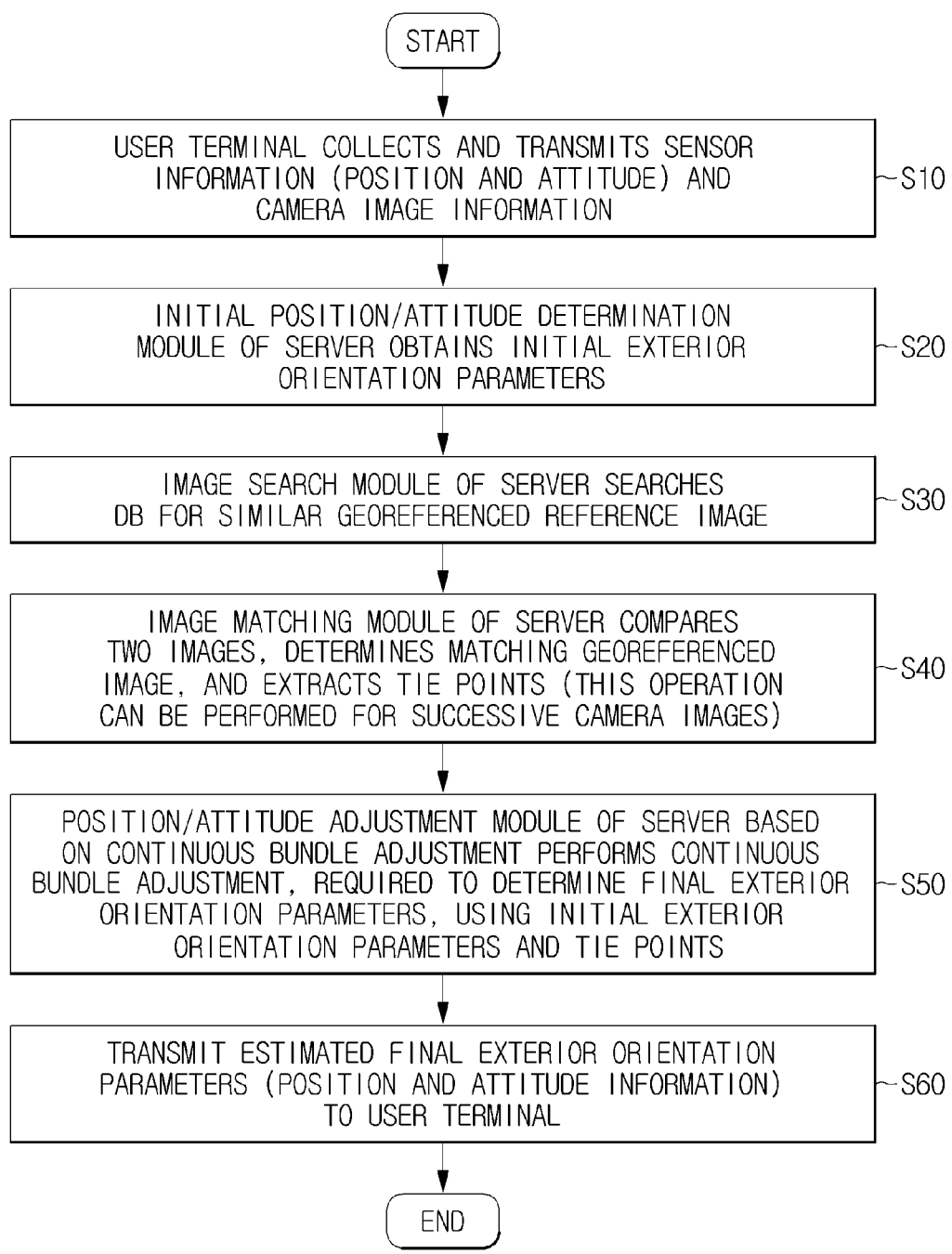

METHOD AND SYSTEM FOR DETERMINING THE LOCATION AND POSITION OF A SMARTPHONE BASED ON IMAGE MATCHING

CROSS-REFERENCE TO RELATED APPLICATIONS

This application is the United States national phase of International Application No. PCT/KR2012/009568 filed Nov. 14, 2012, and claims priority to Korean Patent Application No. 10-2012-0043618 filed Apr. 26, 2012, the disclosures of which are hereby incorporated in their entirety by reference.

TECHNICAL FIELD

The present invention relates, in general, to a method and system for determining the position and attitude of a user terminal such as a smartphone and, more particularly, to a method and system for determining a position and an attitude, which more precisely determine information about the position and attitude of a user terminal, such as a smartphone, using a georeferenced reference image database (DB) that is previously constructed in the user terminal itself or in a server on a network, thus allowing the user terminal to effectively utilize the determined information for location-based services.

BACKGROUND ART

Recently, as the number of smartphone users has increased, and the utilization of smartphones has been greatly expanded, the necessity of systems for map-based road guidance or the provision of additional information has greatly increased. In order to provide information via such a system, the position and attitude of a smartphone must be exactly detected in a real-world coordinate system. However, the determination of the position of a user using a Global Positioning System (GPS) installed in a terminal is currently disadvantageous in that the range of errors is wide and it is almost impossible to provide information in an indoor area.

DISCLOSURE

Technical Problem

Accordingly, the present invention has been made keeping in mind the above problems, and an object of the present invention is to provide a method and system for determining a position and an attitude, which more precisely determine information about the position and attitude of a user terminal such as a smartphone using a georeferenced reference image DB, which is previously constructed in the user terminal or in a server on a network, from sensor information and image information transmitted from the user terminal, thus allowing the user terminal to effectively utilize the determined information for location-based services.

Technical Solution

When the features of the present invention are summarized, a system for determining a position and an attitude of a user terminal according to an aspect of the present invention to accomplish the above object includes a position/attitude determination server for receiving position and attitude-related sensor information and camera images that are transmitted from a user terminal operating in conjunction with the position/attitude determination server through a network, wherein the position/attitude determination server determines position information and attitude information of the user terminal, via georeferencing based on bundle adjustment, from the position and attitude-related sensor information and the camera images transmitted from the user terminal, and feeds the position information and the attitude information back to the user terminal.

The position/attitude determination server may include an initial position/attitude determination module for determining initial position information and initial attitude information of the user terminal, based on the sensor information; a database for previously storing georeferenced reference images in which positions and attitudes of respective cameras, which are obtained at the time of image acquisition via georeferencing, are specified; a search module for searching the database for a georeferenced reference image including an image similar to a received camera image; an image matching module for comparing received camera images with each other or comparing a received camera image with the found georeferenced reference image, and extracting coordinates of image points corresponding to locations of matching images as tie points; and a position/attitude adjustment module for, in order to determine final position information and final attitude information of the user terminal corresponding to the tie points with reference to the database, performing a georeferencing procedure based on bundle adjustment on the matching images, and then correcting the initial position information and initial attitude information.

The sensor information may include position data measured by a Global Positioning System (GPS) module, direction data measured by a compass module, attitude data measured by a gyro sensor, or acceleration data measured by an acceleration sensor.

The image matching module may extract tie points at which respective two images of multiple camera images transmitted from the user terminal are compared with each other, and tie points at which the corresponding camera image transmitted from the user terminal and the found georeferenced reference image are compared with each other, and extracts reliable tie points, causing multiple extracted tie points to meet at a single point so that an error is minimized.

The position/attitude adjustment module may determine the final position information and final attitude information from sensor information and camera images transmitted in real time from the user terminal, and feed the final position information and final attitude information back to the user terminal in real time.

The user terminal may receive given position or attitude-related service information while communicating with other servers on a network, based on the feedback final position information or final attitude information, and display the received information on a map on a screen.

A method for determining a position and an attitude of a user terminal according to another aspect of the present invention includes receiving, by a server operating in conjunction with a user terminal through a network, position and attitude-related sensor information and camera images that are acquired by the user terminal; and determining, by the server, position information and attitude information of the user terminal, via georeferencing based on bundle adjustment, from the position and attitude-related sensor information and the camera images transmitted from the user terminal, and feeding, by the server, the position information and attitude information back to the user terminal.

Determining the position information and attitude information of the user terminal and feeding the information back to the user terminal may include determining initial position information and initial attitude information of the user terminal, based on the sensor information; searching a database for a georeferenced reference image including an image similar to a received camera image, the database previously storing georeferenced reference images in which positions and attitudes of respective cameras, which are obtained at a time of image acquisition via georeferencing, are specified; the positions and attitudes being acquired via georeferencing; comparing received camera images with each other or comparing the received camera image with the found georeferenced reference image, and extracting coordinates of image points corresponding to locations of matching images as tie points; and in order to determine final position information and final attitude information of the user terminal corresponding to the tie points with reference to the database, performing a georeferencing procedure based on bundle adjustment on the matching images, and then correcting the initial position information and initial attitude information.

A method for determining a position and an attitude in a user terminal according to a further aspect of the present invention includes acquiring a camera image using a camera, and measuring position and attitude-related sensor information using one or more sensors; determining initial position information and initial attitude information, based on the sensor information; searching a database for a georeferenced reference image including an image similar to the camera image, the database previously storing georeferenced reference images in which positions and attitudes of respective cameras, which are obtained at a time of image acquisition via georeferencing, are specified; comparing the camera image with the found georeferenced reference image, and extracting coordinates of image points corresponding to locations of matching images as tie points; and in order to determine final position information and final attitude information of the user terminal corresponding to the tie points with reference to the database, performing a georeferencing procedure based on bundle adjustment on the matching images, and then correcting the initial position information and initial attitude information.

An apparatus for determining a position and an attitude of a user terminal according to yet another aspect of the present invention includes a camera for acquiring camera images; a sensor module for measuring position and attitude-related sensor information; an initial position/attitude determination module for determining initial position information and initial attitude information, based on the sensor information; a database for previously storing georeferenced reference images in which positions and attitudes of respective cameras, which are obtained at a time of image acquisition via georeferencing, are specified;

a search module for searching the database for a georeferenced reference image including an image similar to the camera image; an image matching module for comparing the camera image with the found georeferenced reference image, and extracting coordinates of image points corresponding to locations of matching images as tie points; and a position/attitude adjustment module for, in order to determine final position information and final attitude information of the user terminal corresponding to the tie points with reference to the database, performing a georeferencing procedure based on bundle adjustment on the matching images, and then correcting the initial position information and initial attitude information.

Advantageous Effects

In accordance with the method and system for determining the position and attitude of a user terminal according to the present invention, information about the position and attitude of the user terminal is more precisely determined using a georeferenced reference image DB and images captured by a camera, and is provided to the user terminal, and thus the user terminal can effectively utilize the determined information for location-based services. The information about the position and attitude that is provided to the user terminal may be utilized both indoors and outdoors, and may be effectively used for location-based services, such as precise road guidance service, an additional information provision service, and an augmented reality service.

DESCRIPTION OF DRAWINGS

FIG. 3 is a flowchart showing the operation of the system for determining the position and attitude of a user terminal according to an embodiment of the present invention.

BEST MODE

Figure 1:
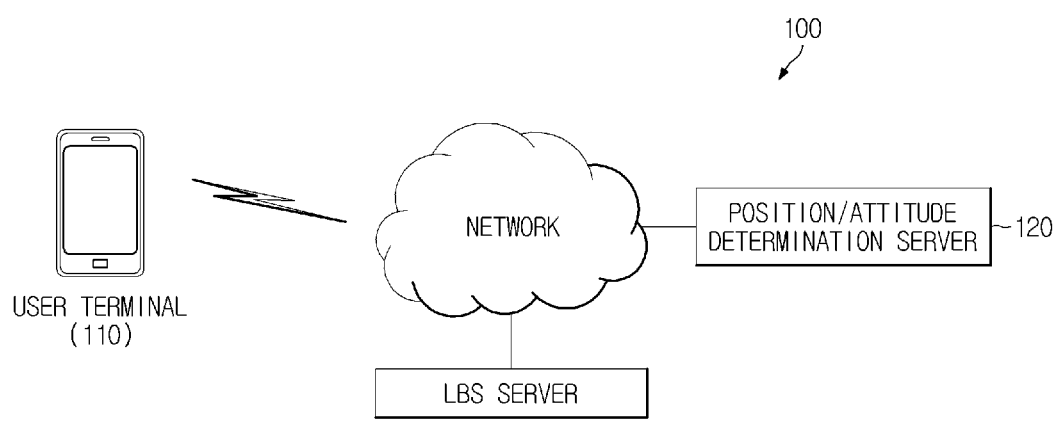
FIG. 1 is a diagram showing a system for determining the position and attitude of a user terminal according to an embodiment of the present invention.

Hereinafter, preferred embodiments of the present invention will be described in detail with reference to the attached drawings and details described in the drawings, but the present invention is not limited or restricted by those embodiments.

FIG. 1 is a diagram showing a system 100 for determining the position and attitude of a user terminal according to an embodiment of the present invention.

Referring to FIG. 1, the system 100 for determining the position and attitude of a user terminal according to the embodiment of the present invention includes a position/attitude determination server 120 for operating in conjunction with a user terminal 110 through a network, and the network may include a Location-Based Service (LBS) server for providing LBS service information related to the position and attitude of the user terminal 110 to the user terminal 110.

Here, the network may be, but is not limited to, the Internet (including a Wi-Fi network), and may include a wireless mobile communication network such as a Wideband Code Division Multiple Access (WCDMA) (including 3rd generation (3G) or Long-Term Evolution (LTE)-based 4G) or Wireless Broadband (WiBro) network, or include a wired telephone network or the like according to circumstances. The user terminal 110 may be provided with a service for transmitting position and attitude-related information (sensor information, camera image information, etc.) acquired by the user terminal 110 from indoor and outdoor areas, while communicating with the position/attitude determination server 120 operating in conjunction with the user terminal through the network, and for receiving, as feedback information, more precisely corrected position and attitude-related information, which is obtained by correcting the information related to the position and attitude at which camera images are to be captured, from the position/attitude determination server 120.

The user terminal 110, which is a terminal capable of accessing the network (e.g., the Internet) and exploiting a data service, may be, but is not limited to, a smartphone such as iPod or Android phone, or may be a portable or mobile terminal such as a cellular phone or a Personal Communications Service (PCS) phone capable of performing communication through the network, a synchronous/asynchronous International Mobile Telecommunication-2000 (IMT-2000) terminal enabling wireless communication, a Personal Digital Assistant (PDA), a Wireless Application Protocol (WAP) phone, a mobile Play-Station, or another type of Portable Multimedia Player (PMP), may be a notebook Personal Computer (PC), a desktop PC, or a palm PC, and may include various types of electronic appliances or devices that are capable of communicating with other electronic appliances and that are commonly used in homes or businesses through the society, according to circumstances.

The user terminal 110 may receive service information related to the corresponding position or attitude while communicating with the LBS server on the network, based on final position information (latitude, longitude, altitude, etc.) or final attitude information (rotation angle information such as a forward movement direction [roll axis direction], direction to the right of the forward movement direction [pitch axis direction], the direction of gravity [yaw axis direction]) which is precisely estimated by and is fed back from the position/attitude determination server 120, and may display the corresponding information on the map on a screen. For example, the user terminal 110 may provide a more precise road guidance service on the map, such as that of a navigation system, provide an augmented reality service for more accurately combining a (virtual) image suitable for a given attitude, and provide various types of additional information suitable for the precise position and attitude of the user terminal 110.

Hereinafter, the operation of the system 100 for determining the position and attitude of a user terminal according to an embodiment of the present invention will be described in detail with reference to the block diagram of the user terminal 110 and the position/attitude determination server 120 of FIG. 2 and the flowchart of FIG. 3.

Figure 2:
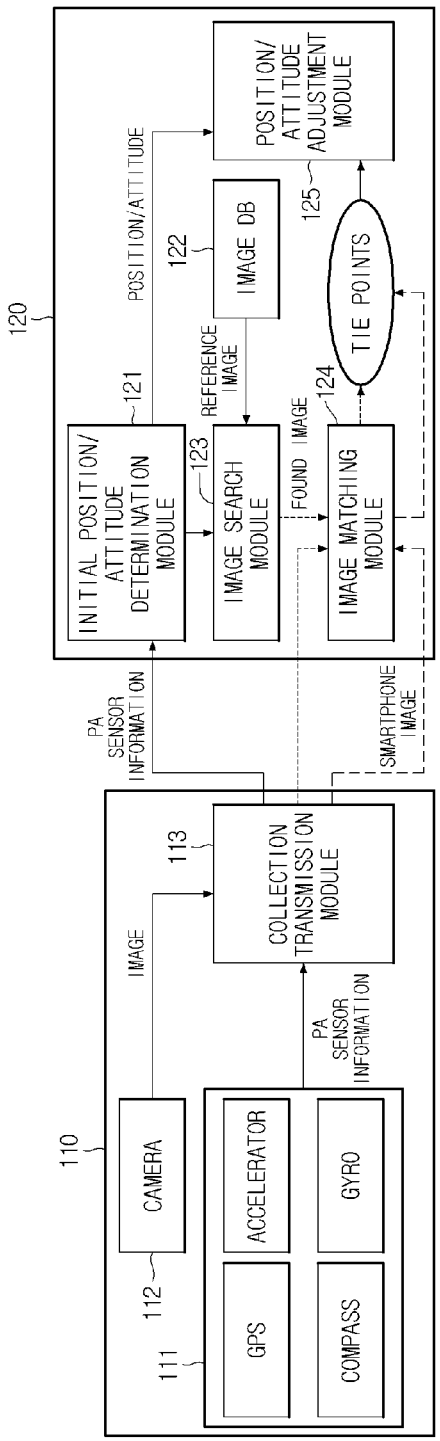
FIG. 2 is a detailed block diagram showing a user terminal and a position/attitude determination server of FIG. 1.

As shown in FIG. 2, the user terminal 110 includes a sensor module 111, a camera 112, and a collection transmission module 113, and the position/attitude determination server 120 includes an initial position/attitude determination module 121, an image database (DB) 122, an image search module 123, an image matching module 124, and a position/attitude adjustment module 125.

First, in the user terminal 110, depending on the manipulation of a user or the operation of a predetermined application for the present service, the sensor module 111 measures position and attitude (PA)-related sensor information, the camera 112 captures surrounding images (which may be a plurality of still images or moving images) and generates camera images, and the collection transmission module 113 collects such position and attitude (PA)-related sensor information and camera images (information), and transmits the collected information to the position/attitude determination server 120 at step (S10 of FIG. 3).

Here, the position and attitude (PA)-related sensor information measured by the sensor module 111 may be position data (latitude, longitude, altitude, etc.) measured by a Global Positioning System (GPS) module, direction data measured by a compass module (information about a movement direction), attitude data measured by a gyro sensor (rotation angle information related to an increment in angular velocity, such as a forward movement direction [roll axis direction], direction to the right of the forward movement direction [pitch axis direction], and the direction of gravity [yaw axis direction]), or acceleration data measured by an acceleration sensor (acceleration information related to a velocity increment in the movement direction).

If the position and attitude (PA)-related sensor information and camera images are transmitted from the user terminal 110, the initial position/attitude determination module 121 determines initial position information ($\phi$, $\lambda$, h) (latitude, longitude, altitude, etc.) and initial attitude information ($\theta_{Roll}$, $\theta_{Pitch}$, $\theta_{Yaw}$) (rotation angle information such as forward movement direction [roll axis direction], direction to the right of the forward movement direction [pitch axis direction], and direction of gravity [yaw axis direction]), as the initial exterior orientation parameters of the user terminal 110, based on the position and attitude (PA)-related sensor information (S20 of FIG. 3).

The initial position/attitude determination module 121 may estimate a velocity and determine position information and attitude information by applying the direction data of the compass module, the attitude data of the gyro sensor, the acceleration data of the acceleration sensor, etc. of the position and attitude (PA)-related sensor information to a predetermined navigation equation, and may determine the above-described initial position information ($\phi$, $\lambda$, h) (latitude, longitude, altitude, etc.) and initial attitude information ($\theta_{Roll}$, $\theta_{Pitch}$, $\theta_{Yaw}$), as the initial exterior orientation parameters of the user terminal 110 by additionally applying the position data of the GPS module to a provided Kalman filter. Technology for estimating navigation information related to a position or attitude using such a navigation equation or Kalman filter is well known in the art, and thus a detailed description thereof is omitted here.

Meanwhile, in the image DB 122, georeferenced reference images corresponding to the positions ($\phi$, $\lambda$, h) and attitudes ($\theta_{Roll}$, $\theta_{Pitch}$, $\theta_{Yaw}$) of respective cameras, which are obtained at the time of image acquisition via georeferencing, and the coordinates of respective image points (ground coordinates of image points) are previously constructed and stored. The image search module 123 searches the image DB 122 for a georeferenced reference image including an image similar to a given camera image received from the user terminal 110 (S30 of FIG. 3). In the image DB 122, the above-described image point coordinates may be stored and be usefully employed to calculate position or attitude-related information, which will be described later, but they are not necessarily required and may be omitted and may be replaced with any relative coordinates of an image that are estimated.

Georeferencing is an algorithm for acquiring three-dimensional (3D) ground coordinate information of a ground object included in an image or a capturing position by using the position and attitude-related data and image data of the camera that are acquired by multiple sensors (Global Positioning System: GPS), an Inertial Measurement Unit (IMU), a digital camera, a laser scanner, etc.). A georeferencing procedure based on Aerial Triangulation (AT) is performed based on continuous position and attitude-related data of a digital camera or the like, and then the coordinates of a ground object (or image points) included in the image or the position and attitude of the camera at a capturing position may be estimated while exterior orientation parameters such as position and attitude-related data are corrected, and the georeferenced images corresponding to the position and attitude at the time of capturing may be acquired.

By means of such georeferencing, georeferenced reference images, in which the positions and attitudes of respective camera at the time of image acquisition are specified, are previously constructed and stored in the DB 122. The image search module 123 may search the image DB 122 for a georeferenced reference image including an image similar to the camera image of the user terminal 110.

The image matching module 124 may compare camera images of the user terminal 110 with each other or compare a camera image with the georeferenced reference image found by the image search module 123 and extract the coordinates of image points of the matching images, corresponding to the capturing position ($\phi$, $\lambda$, h) of the camera, as tie points (conjugate points) (S40 of FIG. 3). Here, in addition to the tie points at which the camera image transmitted from the user terminal 110 and the found georeferenced reference image are compared with each other, one or more tie points between matching image parts when, among multiple camera images transmitted from the user terminal 110, respective two images are compared with each other may be further extracted. Reliable tie points that cause the multiple extracted tie points to meet at one point so that an error is minimized may be calculated.

For example, a condition must be satisfied in which, for a single ground point, image points between matching parts of which a camera image and a georeferenced reference image found by the image search module 123, which are estimated to be the same image, are present on a single straight line in a predetermined collinearity equation. However, even in the case of the same ground points, there may occur a case where the ground points do not meet at a single ground point due to an error between the coordinates of image points (tie points). Thus, by means of a method of least squares, points allowing straight lines of multiple collinearity equations for a single ground point to meet in a close-range in which an error is minimized may be calculated as tie points.

If the tie points have been calculated in this way, the position/attitude adjustment module 125 is configured such that, in order to determine final exterior orientation parameters capable of acquiring the tie points (enabling the corresponding camera images to be captured) using the corresponding tie points, the position/attitude adjustment module 125 may correct the initial exterior orientation parameters (initial position information and initial attitude information) determined by the initial position/attitude determination module 121 from the camera image(s) or georeferenced reference image(s) (or image points of the images) that match each other, and may then determine the final exterior orientation parameters (final position information and final attitude information) of the user terminal 110 (S50 of FIG. 3), and feed the final exterior orientation parameters back to the user terminal 110 (S60 of FIG. 3). In this case, the position/attitude adjustment module 125 successively determines the final position information and final attitude information from the PA sensor information and the camera images transmitted in real time from the user terminal 110, and feeds the final position information and attitude information back to the user terminal 110 in real time. In this case, georeferenced reference images (including ground coordinates of image points) of the corresponding matching parts stored in the DB 122 may be referred to. In this case, the position/attitude adjustment module 125 performs a georeferencing procedure based on bundle adjustment, and corrects the initial exterior orientation parameters (initial position information and attitude information), thus precisely estimating the ground (capturing) coordinates of the user terminal 110 which captures the corresponding images.

Georeferencing based on bundle adjustment is one of indirect methods for determining the position and attitude of the camera, that is, the user terminal 110, at the time of image acquisition. The position/attitude adjustment module 125 based on the bundle adjustment of images exploits a mathematical model (Gauss-Markov with Stochastic Constraints model) that uses a collinearity conditional expression having stochastic constraints, applies the method of least squares to the initial exterior orientation parameters (initial position information and attitude information), with reference to georeferenced reference images (including ground coordinates of image points) corresponding to the positions and attitudes of respective cameras in the DB 122, from parts of the matching image(s)(or the image points of the images), and repeatedly calculates a predetermined normal equation in the above mathematical model, thus estimating final exterior orientation parameters (final position information and final attitude information) that finally converge. Depending on the above-described procedure, information about the final position and the final attitude with a minimum error at which the tie points can be acquired from the matching reference image parts in the predetermined normal equation based on the above-described mathematical model may be estimated to be the information about position and attitude at which the corresponding camera images are to be captured.

As described above, although a procedure in which the user terminal 110 precisely receives, as feedback information, the corresponding position information and attitude information of the user terminal 110 while operating in conjunction with the position/attitude determination server 120 on the network has been illustrated, the procedure is not limited to such an example. The components of the position/attitude determination server 120 are contained in the user terminal 110 as position/attitude determination devices, and thus the user terminal 110 may directly estimate and use the above-described final exterior orientation parameters. That is, the user terminal 110 may include not only the sensor module 111, the camera 112 and the collection transmission module 113, but also the initial position/attitude determination module 121, the image DB 122, the image search module 123, the image matching module 124, and the position/attitude adjustment module 125. In this case, the user terminal 110 may directly estimate the above-described precise final exterior orientation parameters without needing to transmit the position and attitude-related sensor information, camera images, etc. to the server on the network.

The user terminal 110 may receive the corresponding position or attitude-related service information and display the information on the map on the screen while communicating with the LBS server on the network, based on the final exterior orientation parameters which are directly estimated by the user terminal or final exterior orientation parameters which are precisely estimated by the position/attitude determination server 120 on the network and are fed back from the server 120, that is, the final position information ($\phi$, $\lambda$, h) (latitude, longitude, altitude, etc.) or the final attitude information ($\theta_{Roll}$, $\theta_{Pitch}$, $\theta_{Yaw}$). For example, the user terminal 110 can provide a more precise road guidance service on the map, as in the case of the navigation system, implement an augmented reality service for more precisely combining (virtual) images suitable for a given attitude, and provide various types of additional information suitable for the precise position and attitude of the user terminal 110.

Although the present invention has been described with reference to a limited number of embodiments and drawings, the present invention is not limited to the above embodiments, and various changes and modifications can be performed by those skilled in the art to which the present invention pertains from the description of the present invention. Therefore, the scope of the present invention should not be limitedly defined by the above-described embodiments and should be defined by the accompanying claims and equivalents thereof.

The invention claimed is:

1. A system for determining a position and an attitude of a user terminal, comprising:
   a position/attitude determination server for receiving initial exterior orientation parameter and one or more camera images from a user terminal via a network, the position/attitude determination server being connected to a database containing previously georeferenced reference images;
   a search module connected with the position/attitude determination server that searches the database to identify a georeferenced reference image including an image similar to said one or more received from the user terminal;
   an image matching module connected with the position/attitude server that compares at least one camera image received from the user terminal against the georeferenced reference image identified from the database, and extract coordinates of image points corresponding to a location of the two images being compared by the image matching module as first tie points; and
   a position/attitude adjustment module connected to the position/attitude determination server that performs a georeference procedure based on bundle adjustment to determine final exterior orientation parameters of the user terminal corresponding to the first tie points,
   wherein the final exterior orientation parameters of the user terminal determined by the position/attitude adjustment module are transmitted back to the user terminal.

2. The system of claim 1, wherein, when the position/attitude determination server receives a plurality of camera images from the user terminal, the image matching module compares two camera image among the plurality of camera images received from the user terminal, and extract coordinates of image points corresponding to a location of the two camera images being compared by the image matching module as second tie points; and the position/attitude adjustment module performs the georeferenced procedure based on bundle adjustment using the first tie points and the second tie points.

3. The system of claim 2, wherein the image matching module performs the georeferenced procedure based on bundle adjustment to determine final exterior orientation parameters of the user terminal corresponding to reliable tie points, causing a corresponding point of the first tie points and the second tie points to meet at a single point so that an error is minimized.

4. The system of claim 2, wherein the position/attitude adjustment module determines the final exterior orientation parameters and transmits the final exterior orientation parameters back to the user terminal in real time.

5. The system of claim 1, wherein the initial exterior orientation parameter includes position data measured by a Global Positioning System (GPS) module, direction data measured by a compass module, attitude data measured by a gyro sensor, or acceleration data measured by an acceleration sensor of the user terminal.

6. The system of claim 1, wherein the user terminal receives service information corresponding to a location based on the final exterior orientation parameters received from the position/attitude determination server, and displays the received service information on a map on a screen.

7. A method for determining a position and an attitude of a user terminal, comprising:
   receiving initial position and attitude information and one or more camera images that are acquired by the user terminal;
   identifying a georeferenced reference image including an image similar to said one or more camera images received from the user terminal;
   comparing at least one camera image received from the user terminal against the identified georeferenced reference image to extract coordinates of image points corresponding to a location of the two compared images as first tie points;
   performing a georeferenced procedure based on bundle adjustment to determine final position information and attitude information of the user terminal corresponding to the first tie points; and
   transmitting the final position information and attitude information back to the user terminal.

8. The method of claim 7, further comprises:
   upon receiving a plurality of camera images from the user terminal, comparing two camera image among the plurality of camera images received from the user terminal to extract coordinates of image points corresponding to a location of the two compared camera images as second tie points, wherein the georeferenced procedure is performed based on bundle adjustment using the first tie points and the second tie points.

9. A method for determining a position and an attitude in a user terminal, comprising:
   acquiring a camera image using a camera of the user terminal, and determining initial position information and initial attitude information using one or more sensors of the user terminal;
   searching a database provided in the user terminal for a georeferenced reference image including an image similar to the camera image, the database storing previously georeferenced reference images in which each georeferenced reference image is specified with positions and attitude of a camera that has taken the respective georeferenced reference image;
   comparing the camera image with the found georeferenced reference image, and extracting coordinates of image points corresponding to locations of the two compared images as tie points; and
   performing a georeferencing procedure based on bundle adjustment on the two compared images to update the initial position information and initial attitude information.

10. A user terminal, comprising:
    a camera for acquiring a camera image;
    a plurality of sensors for measuring position and attitude-related sensor information;
    a position/attitude determination module for determining initial position information and initial attitude information, based on the position and attitude-related sensor information;
    a database for storing previously georeferenced reference images in which each georeferenced reference image is specified with positions and attitudes of a camera that has taken the respective georeferenced reference image;
a search module for searching the database for a georeferenced reference image including an image similar to the camera image;
an image matching module for comparing the camera image with the found georeferenced reference image, and extracting coordinates of image points corresponding to locations of the two compared images as tie points; and
a position/attitude adjustment module for performing a georeferencing procedure based on bundle adjustment on the two compared images to determine final position information and final attitude information, and to update the initial position information and initial attitude information.

* * * * *